United States Patent Office 3,321,411
Patented May 23, 1967

3,321,411
NOVEL CATALYST SYSTEM FOR THE SYNTHESIS OF UNSATURATED NITRILES
Howard S. Young and Edgar L. McDaniel, Kingsport, Tenn., assignors to Eastman Kodak Company, Rochester, N.Y., a corporation of New Jersey
No Drawing. Filed May 4, 1964, Ser. No. 364,834
9 Claims. (Cl. 252—437)

This invention relates to a process for preparing unsaturated aliphatic nitriles and to novel catalyst compositions useful in the process of the invention. More particularly it relates to a vapor phase process for the production of acrylonitrile by the reaction of propylene, ammonia and oxygen, in the presence of a catalyst comprising a mixture of an oxide of arsenic alone, or together with an oxide of chromium, manganese or iron, and a heteropoly acid of molybdenum containing phosphorus as the central atom on a carrier.

This application is a continuation-in-part of copending application of Howard S. Young, Ser. No. 316,543, filed Oct. 16, 1963 which discloses and claims a catalytic calcined mixture of an oxide of arsenic and a phosphomolybdic acid.

Unsaturated aliphatic nitriles have utility in a wide variety of commercial applications. Thus, acrylonitrile is known to be useful as an intermediate in organic syntheses of pharmaceuticals, dyes, etc., as well as being the basic component in many synthetic polymers that are useful for preparing fibers, films, molded articles, and the like. It is known that unsaturated aliphatic nitriles can be prepared by reacting olefins with ammonia under oxidizing conditions at elevated temperatures. For example, J. N. Cosby in U.S. Patent No. 2,481,826, issued Sept. 13, 1949, describes the preparation of lower aliphatic nitriles such as acrylonitrile, methacrylonitrile and acetonitrile by reacting an olefin such as propene, butene-1, etc. with ammonia and oxygen, at 400–600° C., in the presence of various oxidation catalysts and especially vanadium oxides containing molybdenum oxide. Where propene was used as the starting olefin, yields not exceeding about 6 mole percent (Example 6) of acrylonitrile and a substantial amount (10 mole percent) of hydrogen cyanide were obtained. In J. D. Idol, Jr., U.S. Patent No. 2,904,580, issued Sept. 15, 1959, a vapor phase method is also described for preparing acrylonitrile, wherein a mixture of propylene, ammonia and oxygen is passed over a catalyst comprising the bismuth, tin, and antimony salts of phosphomolybdic and molybdic acids and bismuth phosphotungstate. This process is stated to require not only careful control of the surface area of the catalyst and pressure conditions, but the amount of water employed is a critical factor.

We have now found that by passing a mixture of a short-chain olefin, ammonia and oxygen, in certain proportions, at certain elevated temperatures and in vapor phase, over a catalyst comprising an essentially intimate mixture of (1) an oxide of arsenic alone or together with an oxide of chromium, manganese or iron and (2) a heteropoly acid of molybdenum containing phosphorus as the central atom on a carrier the reaction goes smoothly to a relatively higher conversion to the principal product an unsaturated nitrile, for example, where the olefin is propylene to acrylonitrile, and to a considerably lesser amount of acetonitrile, with a minimum of by-products as compared with prior art processes such as mentioned above, and that water is not critical to efficient operability of this process since excellent conversions and yields of acrylonitrile can be obtained without water as the diluent. The reaction products can be readily recovered from the effluent stream from the reactor by conventional means, e.g. by fractional distillation of the effluent condensate.

The catalyst compositions used in carrying out the process of the invention retain their activity and selectivity over relatively long-life periods without appreciable physical deterioration, thereby providing an efficacious vapor phase catalytic process for the production of unsaturated nitriles from certain olefins, ammonia and oxygen, and more especially acrylonitrile from propylene, ammonia and oxygen. The catalyst compositions are especially well adapted for continuous modes of operation as, for example, in a fluidized bed type of reactor.

It is, accordingly, an object of the invention to provide a novel vapor phase process for the preparation of unsaturated aliphatic nitriles, and in particular acrylonitrile from propylene, ammonia and oxygen, by use of a catalyst comprising an essentially intimate mixture of an oxide of arsenic alone or together with an oxide of chromium, manganese or iron and a heteropoly acid of molybdenum containing phosphorus as the central atom on a carrier.

Another object is to carry out the conversion of propylene, ammonia and oxygen to acrylonitrile in a continuous manner.

Another object is to provide novel catalyst compositions.

Other objects will become apparent from the general description and examples hereinafter.

In accordance with the invention, we prepare unsaturated aliphatic nitriles, and more especially acrylonitrile, by passing a feed mixture comprising a short-chain olefin containing from 3–4 carbon atoms such as, for example, propylene or isobutylene, ammonia and oxygen, in vapor phase at elevated temperatures, over a catalyst comprising an intimate mixture of (1) an oxide of arsenic alone or together with an oxide of chromium, manganese or iron and (2) a heteropoly acid of molybdenum containing phosphorus as the central atom on a carrier. The reaction is illustrated with the preferred process, namely, the conversion of propylene, ammonia and oxygen to acrylonitrile, as follows:

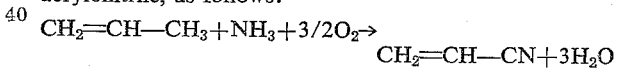

$$CH_2=CH-CH_3 + NH_3 + 3/2 O_2 \rightarrow CH_2=CH-CN + 3H_2O$$

A minor proportion of acetonitrile is also formed.

The ratios of the reactants can be varied widely from the theoretical mole ratios of propylene:oxygen:ammonia of 1:1.5:1. Ratios near this, i.e. about 1: about 1.5: about 1 are preferable; however, the process is operable at propylene:oxygen ratios from 1:0.1 to 1:5, and propylene:ammonia ratios from 1:0.1 to 1:5. Both propylene:oxygen and propylene:ammonia ratios may be varied from the theoretical ratios.

Nitrogen may be fed to the reactor. This has no particular effect upon the chemistry involved; but has the practical advantage that since nitrogen is not detrimental, air may be used as the source of oxygen. In this case, the oxygen to nitrogen ratio is approximately 1:4. Water may be fed to the reactor or it may be omitted. It acts as a diluent and, when used, the preferred amounts in the form of water vapor range from 0.05–2.0 moles, or more, per mole of propylene in the feed. The temperature of the reaction can be varied from about 300° C. to about 600° C., but preferably ranges from about 400° C. to about 550° C. The reaction is not significantly pressure dependent. For example, it may be operated satisfactorily at atmospheric pressure, which condition is preferred, but lower or sub-atmospheric pressures and higher or super-atmospheric pressures may also be used to give generally similarly good results, e.g. from slightly below atmospheric to about 5 atmospheres. The choice of operating pressures may be governed by economic considerations such as are involved in plant design, product recovery, etc. The gaseous hourly space velocity (GHSV)

may also be varied over a wide range, for example, values (STP) as low as 100 may be used, and values as high as 6000 may be used. The preferred space velocity is in the range of about 150 to about 1000. The catalyst may be used either in a fixed bed or in fluidized state. In the latter case, the catalyst exists as small particles which are suspended in an upflowing stream of reactant gases. The latter method of carrying out the invention offers advantages such as, for example, superior temperature control, and less explosive hazard. As previously indicated, water may be included, if desired, although this is not critical for the reaction goes well without such addition. When isobutylene is substituted for the propylene in the above described process, the principal product is methacrylonitrile.

In general, any type of apparatus that is suitable for carrying out the process of the invention in the vapor phase may be employed, e.g., a tubular type of reactor or furnace which can be operated in continuous or intermittent manner and is equipped to contain the catalyst in intimate contact with the entering feed gases. The reacted gases are then conducted to suitable cooling and separatory equipment and the products further separated and recovered by any of the methods known to those skilled in the art. For example, one such method involves scrubbing the effluent gases from the reactor with cooled water or an appropriate solvent to remove the products of the reaction. In such case, the ultimate nitrile products may be separated by conventional means such as distillation of the resulting liquid mixtures. Unreacted ammonia and olefin may be recovered and recirculated through the system. Spent catalyst may also be reactivated by heating in contact with air.

The fluidized bed reactor employed by us in carrying out the process of the examples consisted of on upright cylindrical tube of Vycor Glass of 15 inches length. The lower portion of the tube has an internal diameter of 40 mm. and terminates in a conical bottom which is about 1 inch in length. The lower portion of the tube including the conical bottom is 25 cm. in length. The upper portion of the cylindrical reactor tube has an internal diameter of 55 mm. throughout the greater portion of its length and is tapered at its ends, i.e. where it forms the top end of the cylindrical reactor tube and where it joins the portion of the reactor tube which has an internal diameter of 40 mm. Feed gases were introduced through an inlet tube extending from the top of the reactor and passing through the center of the reactor into the bottom of the catalyst bed. This served to fluidize the catalyst bed and to preheat the feed gases. The reactor was heated electrically. The effluent gases and vapors were led from the reactor through a system of traps which were cooled with a Dry Ice bath. Acrylonitrile, water, acetonitrile, traces of hydrogen cyanide, and unreacted ammonia were collected in these traps. The condensate was washed from the thawed traps with water and this product was analyzed by gas chromatography for nitriles and by titration for ammonia.

The stripped gas stream was then led through a gas sampling valve to a wet test meter. Gas streams were analyzed with Orsat apparatus for unsaturates, carbon dioxide, etc. The stripped gas stream generally contained over 80 percent nitrogen and the rare gases. The unsaturates as determined by Orsat analysis were shown to be propylene by gas chromatography. The balance of the gas stream was propylene, oxygen, carbon dioxide, and carbon monoxide. The techniques described were found expedient and suitable for the practice of this invention. Other suitable techniques, such as are known to those skilled in the art, may be used without in any way limiting the scope of this invention.

In preparing the catalyst compositions employed by us in carrying out the process of the invention, an essentially intimate mixture of a heteropoly acid of molybdenum containing phosphorus as the central atoms such as, for example, dodecamolybdophosphoric acid having the empirical formula $H_3PMo_{12}O_{40}$, a carrier and an oxide of arsenic such as arsenic trioxide ($As_2O_3$) or arsenic pentoxide ($As_2O_5$) or mixtures thereof, is prepared and calcined. The calcination can be carried out, for example, by heating the catalyst mixture at a temperature of from about 200° C. to about 600° C. for a period of several hours or more. The calcined mixture is then reduced to operable granules or particles. Preferably the calcining operation is carried out in the presence of air or other suitable oxygen-containing gaseous mixture. However, it can be conducted in the absence of oxygen. The dodecamolybdophosphoric acid used in preparing the catalyst compositions of the invention was commercial dodecamolybdophosphoric acid containing about thirty moles of water as hydrate per mole of acid.

The heteropoly acid or its ammonium salt can be used in the preparation of the catalyst. Presumably, the ammonium salt of the acid decomposes wholly, or in part, to ammonia and the acid under calcination or during use at reaction temperature. The concentration of the heteropoly acid of molybdenum containing phosphorus can vary from about 5% to about 60% (preferably 30 to 50%) by weight of the catalyst. The concentration of the oxide of arsenic, calculated as $As_2O_5$, can vary from about 1% to about 20% (preferably 1 to 10%) by weight of the catalyst. The concentration of the oxide of chromium, manganese or iron can vary from about 0.1% to about 25% (preferably 2 to 10%) by weight of the catalyst. The heteropoly acid is always present in a greater percent by weight than the oxide of arsenic or the oxide of chromium, manganese or iron. The carrier can comprise about 30% to about 94% by weight of the catalyst composition. The most outstanding results in accordance with the invention are obtained with catalysts comprising 40 to 70% by weight of carrier. The heteropoly acid and the metallic oxides just named are supported on a carrier because it is advantageous to support them on a carrier. The percentages just given are for calcined carrier-supported catalysts. Thus the weight of the catalyst includes the weight of the carrier.

It may be that there is compound formation between the oxide of arsenic and the oxide of chromium, manganese or iron. The chromium, manganese and iron components can be added directly as oxides or in the form of any other compounds, for example, salts such as the nitrates, sulfates, etc. which decompose to the oxides on heating. The preferred oxides of chromium, manganese and iron are chromic oxide, manganic oxide and ferric oxide.

Carriers that can be employed include, for example, silica, silica-alumina, kieselguhr, pumice, titania, zirconia, clay, etc. The use of silica as a carrier is preferred. The term silica includes silica gel, for example. The catalyst compositions can be readily regenerated by treatment with air or a gas containing molecular oxygen at or above the reaction temperature. While the arsenic-promoted molybdenum heteropoly acid catalysts of the invention are active and selective for the synthesis, the addition of the chromium, manganese or iron component improves the physical strength and activity of the catalyst. It is possible that when an oxide of arsenic promoter is used in conjunction with chromium, manganese or iron, metal arsenates are formed. Physical strength is important in any solid catalyst, and especially in the case of those to be used in a fluidized state where the catalyst must be strong enough to resist attrition.

The definitions of certain terms used in the examples and Table 1 are defined as follows:

Contact time is the average time in seconds which the reactants spend at reaction conditions in a volume equal to that of the catalyst bed.

Gaseous hourly space velocity (GHSV) is defined as the number of volumes of feed gases (STP) which pass through one volume of catalyst bed in one hour.

The percent conversion to acrylonitrile may be based on propylene or on ammonia.

Based on propylene, percent conversion =

$$\frac{\text{moles acrylonitrile formed}}{\text{moles propylene fed}} \times 100$$

Based on ammonia, percent conversion =

$$\frac{\text{moles acrylonitrile formed}}{\text{moles ammonia fed}} \times 100$$

The yield may be calculated based on propylene or on ammonia.

Based on propylene, percent yield =

$$\frac{\text{moles acrylonitrile formed}}{\text{total moles propylene consumed}} \times 100$$

Based on ammonia, percent yield =

$$\frac{\text{moles acrylonitrile formed}}{\text{total moles ammonia consumed}} \times 100$$

Conversions and yields to acetonitrile are similarly defined with moles of acetonitrile formed replacing moles of acrylonitrile in the appropriate expression.

This invention is further illustrated by the following Examples 1–3 of preferred embodiments thereof although it will be understood that these examples are included primarily for purposes of illustration and are not intended to limit the scope of the invention unless otherwise specifically indicated:

Example 1

A catalyst comprising by weight 5.2 percent arsenic pentoxide and 41.6 percent dodecamolybdophosphoric acid on silica was prepared in the following manner. To 825 g. of 30 percent silica sol was added a solution of 252 g. dodecamolybdophosphoric acid triacontahydrate in 150 ml. water. A solution of 24.4 g. arsenic pentoxide in 150 ml. of water was then added, and the yellow liquid was heated with stirring. After it thickened, the yellow slurry was transferred to an evaporating dish and dried on a steam bath. The preparation was calcined for 15 hours in a muffle furnace at 200° C.

Two hundred milliliters of 40 x 100 mesh of above material was charged to a fluidized-solids reactor, and the test results shown in Table I were collected. This catalyst exhibited high conversion and yield of acrylonitrile.

Example 2

A catalyst which comprised by weight 2.7 percent arsenic pentoxide and 42.8 percent dodecamolybdophosphoric acid on silica was prepared as follows:

A solution containing 252 g. of hydrated dodecamolybdophosphoric acid and a few drops of concentrated nitric acid in 150 ml. of water was prepared using commercial dodecamolybdophosphoric acid. In this work we assume that the commercially available acid contains thirty moles of water as hydrate per mole of acid; variations in water of hydration would result only in minor changes in the concentration of phosphomolybdic acid in the finished catalyst. To 825 g. of 30% silica sol, ammonia-stabilized, was added the phosphomolybdic acid solution, followed by 12.4 g. of arsenic pentoxide in 100 ml. of water. The sol was stirred and heated on a steam bath for twenty minutes, yielding a thick slurry which was dried on a steam bath. It was then calcined in a muffle furnace at 200° C. for four hours.

Two hundred milliliters of 40 x 100 mesh of above catalyst was charged to a fluidized-solids reactor, and the data shown in Table 1 were collected. This was also an active and selective catalyst for acrylonitrile synthesis.

TABLE 1

| Catalyst Example | | Temp., °C. | Mole Ratios, $C_3H_6:O_2:NH_3:H_2O:N_2$ | GHSV, STP | Percent | | | | | |
|---|---|---|---|---|---|---|---|---|---|---|
| | | | | | Convn. to ACN,[2] on $C_3H_6$ | Convn. to ACN,[2] on $NH_3$ | Yield of ACN,[2] on $C_3H_6$ | Yield of ACN,[2] on $NH_3$ | Convn. to MeCN, on $C_3H_6$ | Yield of MeCN, on $C_3H_6$ |
| 1 | 5.2% $As_2O_5$+41.6% $H_3PMo_{12}O_{40}$ on $SiO_2$. | 495 | 1:1.5:1:1:6 | 630 | 35.8 | 35.8 | 54.2 | 35.8 | 4.6 | 7.0 |
| | | 495 | 1:1.5:1:1:6 | 630 | 35.8 | 35.8 | 50.5 | 35.8 | 6.3 | 8.9 |
| | | 495 | 1:1.5:1:1:6 | 720 | 38.7 | 38.7 | 57.9 | 38.7 | 7.7 | 11.5 |
| | | 495 | 1:1.5:1:1:6 | 900 | 34.8 | 34.8 | 55.8 | 35.6 | 6.4 | 10.3 |
| | | 495 | 1:2:1.25:1:8 | 720 | 33.7 | 26.8 | 50.6 | 26.8 | 8.7 | 13.1 |
| | | 495 | [1]1:1.5:1:0:7 | 630 | 35.0 | 35.0 | 51.9 | 35.0 | 6.5 | 9.6 |
| 2 | 2.7% $As_2O_5$+42.8% $H_3PMo_{12}O_{40}$ on $SiO_2$. | 495 | 1:1.5:1:1:6 | 630 | 33.2 | 33.2 | 49.1 | 33.2 | 8.2 | 12.0 |
| | | 495 | 1:1.5:1:1:6 | 630 | 36.0 | 36.0 | 55.9 | 36.0 | 9.7 | 14.8 |
| | | 495 | 1:1.5:1:1:6 | 720 | 36.7 | 36.7 | 53.5 | 36.7 | 8.5 | 12.4 |
| | | 490 | 1:1.5:1:1:6 | 540 | 37.8 | 37.8 | 49.8 | 37.8 | 9.8 | 12.9 |
| | | 485 | 1:2:1.25:1:8 | 630 | 30.0 | 24.2 | 38.7 | 25.4 | 7.8 | 10.0 |
| | | 465 | 1:1.5:1:1:6 | 540 | 25.0 | 25.0 | 33.5 | 27.8 | 13.8 | 18.5 |
| | | 455 | 1:2:1.25:1:8 | 630 | 19.3 | 15.5 | 26.9 | 18.5 | 13.8 | 19.3 |
| | | 465 | [1]1:1.5:1:0:7 | 540 | 28.4 | 28.4 | 39.2 | 30.9 | 14.7 | 20.3 |

[1] No water fed in this cut.
[2] ACN stands for acrylonitrile.

Example 3

This example illustrates the three-component catalysts of the invention comprising arsenic pentoxide together with chromic oxide and dodecamolybdophosphoric acid for the conversion of propylene and ammonia to acrylonitrile.

A catalyst comprising by weight 8.0 percent chromic oxide, 12.1 percent arsenic pentoxide and 30 percent dodecamolybdophosphoric acid on silica was prepared in the following manner. To 667 g. of stirred, ammonia-stabilized, 30% silica sol was added a solution of 156 g. of hydrated dodecamolybdophosphoric acid and a few drops of nitric acid in 100 ml. of water, and the sol was heated to near the boiling point. Then a solution of 167 g. chromium nitrate nonahydrate in 150 ml. of water was added, followed by 48.9 g. of arsenic pentoxide in 150 ml. of water. The sol was heated with stirring until it gelled; it was dried and then calcined for 2½ hours at 200° C. and 1½ hours at 500° C. in a muffle furnace. This catalyst had excellent physical properties.

A 150-ml. sample of 40 x 120 mesh catalyst was charged to the reactor. A feed stream of 267 ml. propylene, 267 ml. ammonia, 2000 ml. air, and 267 ml. water vapor per minute, STP, was charged to the reactor. Reaction temperature was 500° C., and the contact time was 1.1 seconds. Over 30 minutes of operation, 3.52 g. of acrylonitrile and 0.35 g. of acetonitrile were obtained. This corresponded to a conversion to acrylonitrile of 20.0 percent, based on propylene or on ammonia. The acrylonitrile yield was 43.3 percent, on propylene, and 28.9 percent, on ammonia. The conversion to acetonitrile was 2.5 percent.

In place of the chromic oxide containing catalyst in Example 3, there may be substituted generally similar catalyst compositions wherein the chromic oxide is replaced with an oxide of manganese such as for example, $Mn_2O_3$, or an oxide of iron such as, for example, $Fe_2O_3$. These catalysts likewise have improved physical properties and give generally similar conversions of propylene to acrylonitrile as the chromic oxide containing catalysts.

Other catalyst compositions coming within the specified ranges of components of the invention can also be prepared, in general, by the procedures described in above Examples 1–3. These catalysts likewise give high conversions of propylene, ammonia and oxygen to acrylonitrile with a minimum production of acetonitrile and other by-products when employed in accordance with the process of the invention. Also, as previously indicated, isobutylene may be substituted for the propylene in the examples to give satisfactory yields of methacrylonitrile.

This invention has been described in detail with particular reference to preferred embodiments thereof, but it will be understood that variations and modifications can be effected within the spirit and scope of the invention as described hereinbefore and as defined in the appended claims.

We claim:

1. A catalyst consisting essentially of a calcined mixture of (1) 5 to 60% by weight of a heteropoly acid of molybdenum containing phosphorus as the central atom, (2) 1 to 20% by weight of an oxide of arsenic, calculated as $As_2O_5$, (3) 2 to 10% by weight of a compound selected from the group consisting of an oxide of chromium and an oxide of manganese, and (4) 30 to 93.9% by weight carrier, wherein (1), (2) and (3) are supported on said carrier and wherein said heteropoly acid is present in greater percent by weight than any metal oxide present in the catalyst.

2. A catalyst consisting essentially of a calcined mixture of (1) 30 to 50% by weight of a heteropoly acid of molybdenum containing phosphorus as the central atom, (2) 1 to 10% by weight of an oxide of arsenic, calculated as $As_2O_5$, and (3) 2 to 10% by weight of a compound selected from the group consisting of an oxide of chromium and an oxide of manganese, and (4) 40 to 70% by weight of a carrier, and wherein (1), (2) and (3) are supported on said carrier.

3. A catalyst in accordance with claim 1 wherein the oxide of arsenic is arsenic pentoxide.

4. A catalyst in accordance with claim 3 wherein the heteropoly acid is dodecamolybdophosphoric acid.

5. A catalyst in accordance with claim 4 wherein the carrier is silica.

6. A catalyst in accordance with claim 2 wherein the oxide of arsenic is arsenic pentoxide.

7. A catalyst in accordance with claim 6 wherein the heteropoly acid is dodecamolybdophosphoric acid.

8. A catalyst in accordance with claim 7 wherein the carrier is silica.

9. A catalytic calcined mixture containing:

|  | Percent by weight |
|---|---|
| (1) Arsenic pentoxide | 12.1 |
| (2) Chromic oxide | 8.0 |
| (3) Dodecamolybdophosphoric acid | 30.0 |
| (4) Silica | 49.9 | and wherein said arsenic pentoxide, chromic oxide and dodecamolybdophosphoric acid are supported on the silica.

References Cited by the Examiner

UNITED STATES PATENTS

| | | | |
|---|---|---|---|
| 2,481,826 | 9/1949 | Cosby | 260—465.3 |
| 2,772,244 | 11/1956 | Shalit et al. | 252—437 |
| 2,773,836 | 12/1956 | Shalit et al. | 252—437 |
| 2,798,890 | 7/1957 | Waterman et al. | 260—683.15 |
| 2,881,212 | 4/1959 | Idol et al. | 252—437 X |
| 2,904,580 | 9/1959 | Idol | 260—465.3 |
| 3,126,407 | 3/1964 | Cottle et al. | 260—465.3 |
| 3,135,783 | 6/1964 | Sennewald et al. | 260—465.3 |
| 3,190,913 | 6/1965 | Fetterly et al. | 252—435 X |
| 3,254,110 | 5/1966 | Sennewald et al. | 252—437 X |

OSCAR R. VERTIZ, *Primary Examiner.*

CHARLES B. PARKER, MAURICE A. BRINDISI,
*Examiners.*

J. P. BRUST, R. M. DAVIDSON, A. GREIF,
*Assistant Examiners.*